United States Patent
Hosini et al.

(10) Patent No.: US 9,013,901 B2
(45) Date of Patent: Apr. 21, 2015

(54) MODULAR VOLTAGE SOURCE CONVERTER

(75) Inventors: Falah Hosini, Västerås (SE); Dimitris Giannoccaro, Stockholm (SE); George Nikhil, Perungudi (IN); Vechalapu Kasunaidu, Visakhapatnam (IN)

(73) Assignee: ABB Technology Ltd, Zürich (CH)

( * ) Notice: Subject to any disclaimer, the term of this patent is extended or adjusted under 35 U.S.C. 154(b) by 0 days.

(21) Appl. No.: 14/370,001

(22) PCT Filed: Dec. 30, 2011

(86) PCT No.: PCT/EP2011/074288
§ 371 (c)(1),
(2), (4) Date: Sep. 15, 2014

(87) PCT Pub. No.: WO2013/097906
PCT Pub. Date: Jul. 4, 2013

(65) Prior Publication Data
US 2015/0055385 A1    Feb. 26, 2015

(51) Int. Cl.
*H02J 1/10*    (2006.01)
*H02M 7/08*    (2006.01)
*H02M 7/48*    (2006.01)
*H02M 7/5387*  (2007.01)

(52) U.S. Cl.
CPC .................................. *H02M 7/5387* (2013.01)

(58) Field of Classification Search
CPC ............ H02M 2001/007; H02M 7/23; H02M 3/1584; H02M 2007/4835
USPC ....................................................... 363/65–71
See application file for complete search history.

(56) References Cited

U.S. PATENT DOCUMENTS

| 7,269,037 | B2 | 9/2007 | Marquardt | |
| 2008/0252142 | A1* | 10/2008 | Davies et al. | 307/42 |
| 2011/0267852 | A1* | 11/2011 | Asplund | 363/55 |
| 2013/0215658 | A1* | 8/2013 | Jakob et al. | 363/127 |

FOREIGN PATENT DOCUMENTS

| DE | 37 41 595 C1 | 7/1989 |
| EP | 1 113 570 A1 | 7/2001 |
| WO | WO 2008/030919 A2 | 3/2008 |
| WO | WO 2010/102666 A1 | 9/2010 |

* cited by examiner

*Primary Examiner* — Jue Zhang
(74) *Attorney, Agent, or Firm* — Birch, Stewart, Kolasch & Birch, LLP

(57) ABSTRACT

A modular voltage source converter (100) comprises a plurality of cells conformal to a basic cell design comprising a first and a second terminal, a capacitor and at least two switches arranged in a half-bridge or full-bridge configuration. In the converter, a first group is formed by a number n of cells (101-$k$, $k=1, n$) connected serially at their terminals, and a second group is formed by an equal number n of cells (102-$k$, $k=1, n$) connected serially at their terminals. The terminals of the cells (101-$k$) in said first group are connected, via a resistive or inductive connection element (110-$k$), to the terminals of corresponding cells (102-$k$) in said second group.

20 Claims, 4 Drawing Sheets

MODULAR VOLTAGE SOURCE CONVERTER

FIELD OF THE INVENTION

The invention disclosed herein generally relates to the field of power semiconductor devices. More precisely, it relates to a modular voltage source converter (VSC) comprising switching cells arranged in series and/or in parallel, wherein the number and configuration of the switching cells may be varied in order to adapt the VSC to fulfil different switching tasks.

BACKGROUND OF THE INVENTION

A VSC is a controllable voltage source, with an input connected to at least one capacitor functioning as a DC voltage source. At the outputs, the converter is operable to create a variable AC voltage. This is achieved by connecting the voltages of the capacitor or capacitors directly to any of the converter outputs using the switches in the VSC. In converters that utilise pulse-width modulation (PWM), the input DC voltage is normally kept constant when creating output voltage waveforms that in average are sinusoidal. The amplitude, the frequency and the phase of the AC voltage can be controlled by changing the switching pattern.

As discussed in WO 2010/102666 A1, a VSC may be formed by converter cells connected in series. This improves the smoothness of the AC output at a given switching frequency and for given filtering. The cells may be single-phase full-bridge converters, typically referred to as chain-link cells. A chain-link based converter comprises a number of series-connected cell modules, each cell comprising a capacitor, besides the switches. The number of cells in series in each phase is proportional to the AC voltage rating of the system and may consequently include a large number of cells for high AC voltage systems.

In order to adapt a VSC of this general type to a given AC current rating, two main approaches are known in the art. One option is to arrange sequences of serially connected cells in parallel, wherein each sequence provides a share of the total current without exceeding its own current rating. Due to the complex dynamics of the respective sequences, advanced control is needed in order to avoid imbalances between parallel sequences. Another option is to design a chain-link cell, the critical components of which withstand the required switching current, wherein copies of the cell are to be arranged into a single sequence in accordance with the required switching voltage. In order for the resulting VSC to meet reasonable quality expectations, in particular regarding energy efficiency, this approach leaves the designer in a dilemma regarding the size of the range of cell types to be offered. In a small range, there is statistical certainty that some cells will be installed in applications were they are under-utilized while still occupying a large footprint. Accordingly, the cost for a VSC according to this approach may vary unexpectedly in relation to the electric power subject to switching. A large range of cell types, on the other hand, will necessitate an extensive effort to develop, high costs to manufacture (e.g., the number of common parts may be small) and difficulties related to inventory management.

SUMMARY OF THE INVENTION

It is in view of the above limitations of the prior art that the present invention has been made. It is an object of the present invention to propose a novel and advantageous VSC design. It is a particular object to provide a basic VSC design which is easily adaptable to a given switching task specified by, e.g., a rated current and/or a rated voltage. It is a further particular object to provide an adaptable VSC design having a stable cost-to-power relationship.

Accordingly, the invention provides a modular VSC and a method of providing such modular VSC as defined by the independent claims.

In the modular VSC according to the invention, the cells are arranged in a matrix of cells in series and in parallel. The serial connections between the cell terminals are realized as connection lines, i.e., low-impedance conductive elements. The parallel connections are realized by connecting elements which dynamically or statically limit the current flowing between corresponding outputs of corresponding elements in different groups. Said connecting elements may be inductive or resistive. Each connecting element may have a resistive and inductive character and/or connecting elements of different types may be deployed in one single VSC.

The cells in the VSC need not be completely identical in all respects, but are conformal to a basic cell design. While cells arranged in series may not be identical, cells arranged in parallel preferably have identical or near-identical quantitative properties, e.g., numerical values characterising the components. A basic cell design specifies, inter alia, that a cell is to comprise a first and a second terminal. Two cells in different groups are "corresponding", in the sense of the claims, if they are arranged at corresponding locations in the respective groups. In other words, the cells are neighbours with respect to the parallel direction of the cell matrix. Two terminals are "corresponding" if both are first terminals or both are second terminals in their respective cells. In a symmetric cell, the status as "first" and "second" terminal may be determined with respect to the surrounding circuitry; by convention, one may consider that in a cell with a given sequential number the terminal which is connected to an adjacent cell with next lower sequential number is "first", or that the terminal which is connected closest to a given current rail is "first".

By virtue of the resistive or inductive connections between parallel corresponding cells, a VSC rated for a required switching task can be designed and assembled from cells (modules) with great ease. The VSC is adaptable both regarding voltage and current ratings. The number of parallel cells, i.e., parallel corresponding cells, is related to the current rating of the VSC, while the length of each group of serially connected cells is related to the switching voltage. Hence, if a cell is rated for a voltage of $C_U$ V and a current of $C_I$ A, then a VSC comprising m parallel groups of n serial cells will in principle be rated for a switching voltage of $n \times C_U$ V and a switching current of $m \times C_I$ A. It is a matter of resolution, that is, the smallness of the basic cell design in terms of rating, how tightly the assembled VSC will match the designed requirement. If the connecting elements and the non-resistive interconnections are neglected, the total VSC cost will be approximately proportional to the number of cells required and hence to the product of the required rated voltage and current. Hence, the invention fulfils at least one of its objects.

It is emphasized that the presence of several parallel cells interconnected by connecting elements does not in itself represent a greater safety hazard than a single cell. Indeed, the capacitors of different cells would in the absence of the connecting elements be located electrically parallel. In such circumstances, an electric fault in one of the cells would liberate an accumulated electric energy corresponding to the sum of the capacities of the parallel capacitors. A VSC with these characteristics would need to be structurally robust. A VSC equipped with the resistive or inductive interconnecting elements according to the invention cannot be subject to this failure scenario. Hence, the single-capacitor failure indeed becomes the dimensioning load on the structure, and the requirements on structural robustness can be relaxed. This provides for a potential reduction in weight, cost and dimensions of the VSC. This represents another advantage of the invention.

Furthermore, since the connecting elements help even out currents between corresponding cells, each cell will contribute a current of stable amplitude to the total output current of the VSC. This is beneficial to the cell lifetime and may extend the servicing intervals of the VSC.

The basic cell design may comprise additional switches. For instance, it may comprise four switches arranged in full-bridge configuration, wherein the cell is operable in two conducting states with opposite polarity.

The switches of the basic cell design may comprise a per se known semiconductor switching component, namely an insulated gate bipolar transistor (IGBT), possibly equipped with a free-wheeling diode to form a reverse-conducting insulated gate bipolar transistor (RC-IGBT), a bi-mode insulated gate transistor (BIGT), a gate turn-off thyristor (GTO), an integrated gate commutated thyristor (IGCT) or a metal-oxide-semiconductor field-effect transistor (MOSFET). Switches of different types may be combined within a cell design. Likewise, cells differing by the components from which their switches are realized may be combined in the modular VSC provided they conform to the basic cell design. Nevertheless, the economically most advantageous option may still be to repeat the same basic cell design identically throughout the VSC.

Advantageously, parallel groups of n cells are interconnected by n+1 connecting elements, so that each terminal is connected to a terminal of at least one corresponding cell in a different group via the connecting element. In other words, both the first and second terminals of the cells are connected (possibly, depending on the exact location of the connecting element, via a segment of the terminal of an adjacent cell) to terminals of other cells.

In one embodiment, a VSC comprises more than two parallel groups, and the first terminals of all corresponding cells in different groups are interconnected by a common connecting element. For instance, in a VSC with six parallel groups each comprising ten cells, there are eleven connecting elements, out of which each non-outer element is in direct electric contact with twelve cells. Alternatively, several connecting elements connecting the terminals in a pairwise fashion may be arranged.

As a further development of the preceding embodiment comprising common connecting elements, the common connecting element may be designed and installed so as to structurally reinforce the arrangement of cells in the VSC. Firstly, the materials, shape, manufacturing methods and dimensions of each connecting element may be chosen to obtain desirable mechanical properties. As an example, each connecting element may be a straight, angled or curved solid bar, the material of which highly resistive so as to effectively limit current even though the bar has relatively large cross-section area. Secondly, the dimensions of the terminals connecting the common connecting elements may be chosen in order that the relative movements of the cells are limited. Thirdly, the terminal may be attached to the common connecting element rigidly (or non-rotatably), e.g., by soldering, welding or by use of suitable plugs contacts. As a fourth option, the electric layout of the cells may be chosen in order that the connecting elements extend in more than one dimension, e.g., acting as cross bars which stiffen the structure.

In use, the cells in a VSC according to the invention are preferably operated with the aim that corresponding cells belonging to different groups output identical terminal voltage at all times. This may be achieved, for instance, if each cell contains logic configured for accepting a high-level command expressing the voltage to be provided by the cell and for controlling switches and possibly other sub-cell component in order to achieve this. Hence, in normal operation, only weak currents are able to flow through each connecting element as a result of component tolerances and the like, and the dissipation of energy is small. The connecting elements come into play primarily when an imbalance or an abnormal condition arises.

As an alternative to this case where the output voltage is the controlled quantity, it is possible to supply identical or corresponding control signals to corresponding switches within corresponding cells. In other words, a copy of a set of control signals to be applied to the switches of one cell may be forwarded to its corresponding cells in other groups. This simplifies the control of the VSC, since only a reduced number of independent control signals are generated.

As already noted, when the VSC is operating normally, only small currents flow in each connecting element. This fact may be utilised in order to detect an abnormal condition in a simple manner. Advantageously, the VSC is equipped with a current sensor detecting whether non-negligible current flows in the connecting element. The current sensor may be a serially connected shunt, a voltage divider connected at two points on the connecting element, a comparator arranged to detect voltage across the element or an inductive instrument. The current sensor may be configured to emit a failure signal in response to a detected current with an intensity exceeding a predetermined threshold. In a VSC comprising more than two cell groups, several current sensors may be arranged at the connecting elements between corresponding cells within the same set. Since the start and end points of a given current flow may be determined with greater accuracy using this setup, it is possible to reduce the number of possible locations of a faulty cell.

An abnormal cell may be located by monitoring currents flowing in a connecting element to which the cell is connected or by relying on other diagnostic measures, e.g., a failure signal emitted by the cell itself. In this condition, the corresponding cells are operated in zero-voltage mode. It is recalled that the corresponding cells are any cells connected between the same two consecutive connecting elements as the faulty cell. As described in more detail in WO 2010/102666 A1, such zero-voltage mode may include bypassing the faulty cell by maintaining zero potential difference over its terminals. Nevertheless, normal switching operation of the VSC is continued to the greatest possible extent. With time, unless the zero voltage mode control achieves its intended result ideally, the faulty cell may develop into a complete electric interruption, at which point it is not necessary to pursue the zero-voltage mode any further.

The method aspect of the present invention may be implemented as computer-readable instructions stored or distributed on a computer-readable medium to form a computer program product.

It is noted that the invention relates to all combination of features, even if recited in mutually different claims.

BRIEF DESCRIPTION OF THE DRAWINGS

Embodiments of the invention will now be described with reference to the accompanying drawings, on which.

All the figures are schematic and generally only show parts which are necessary in order to elucidate the invention, whereas other parts may be omitted or merely suggested. Unless otherwise indicated, like reference numerals refer to like parts in different figures.

DETAILED DESCRIPTION OF EMBODIMENTS

Figure 1:
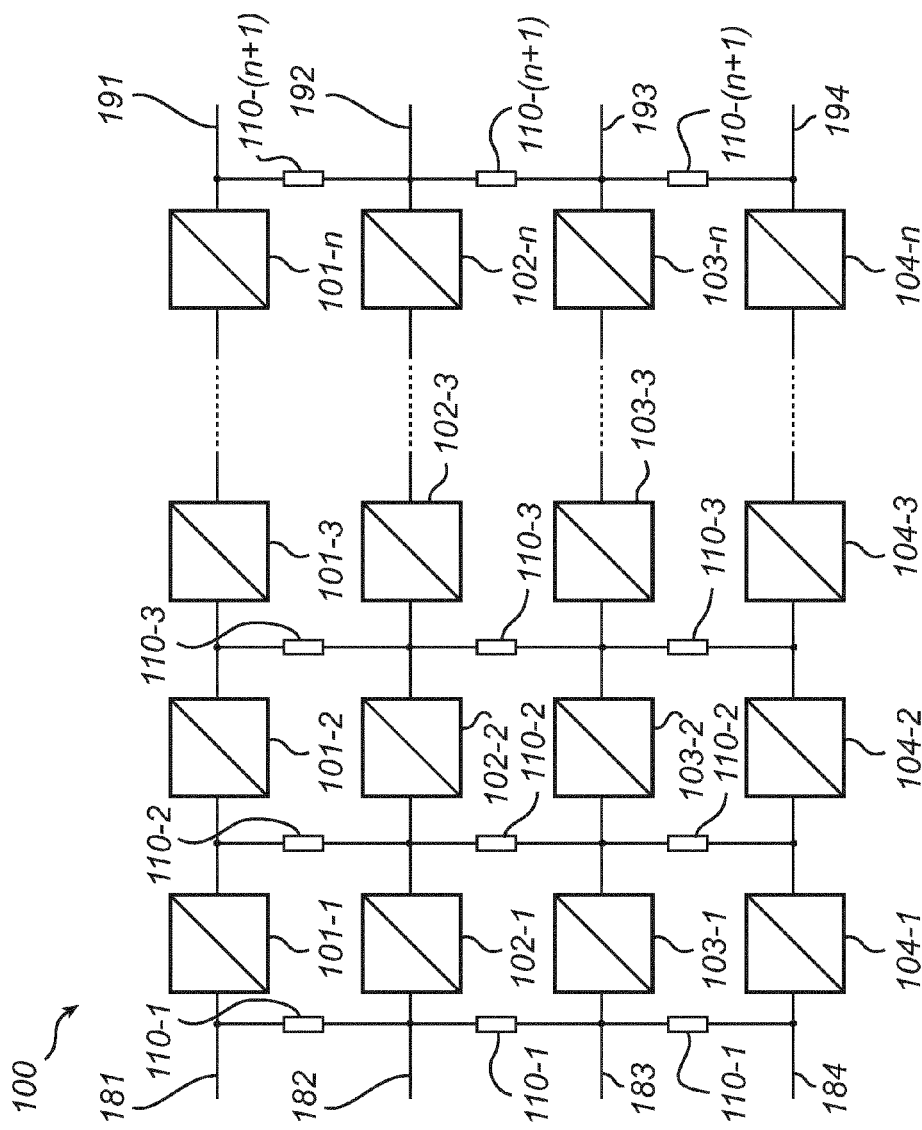
FIGS. 1, 3 and 5 show modular VSCs according to embodiments of the present invention.

FIG. 1 is a circuit diagram of a modular VSC 100 according to a first embodiment of the invention. The VSC 100 comprises a first group of n cells 101-1, 101-2, 101-3, . . . , 101-*n*, a second group of n cells 102-1, 102-2, 102-3, . . . , 102-*n*, a third group of n cells 103-1, 103-2, 103-3, . . . , 103-*n*, and a fourth group of n cells 104-1, 104-2, 104-3, . . . , 104-*n*. In this embodiment, there are provided left 181, 182, 183, 184 and right 191, 192, 193, 194 converter output terminals (or rails). Hence, the groups are in one sense electrically parallel to one another, but only via the current-limiting connecting elements. Within each cell group, the terminals of the cells are connected in series. Further, the groups are interconnected by n+1 connecting elements 110-1, 110-2, . . . , 110-(*n*+1). In the first embodiment depicted in FIG. 1, each connecting element 110-*k* is shown as a plurality of partial resistors, which carry the same reference numeral and connect pairs of terminals of corresponding cells belonging to different groups. Using the terminology introduced above, there are n sets of corresponding cells, namely 101-*k*, 102-*k*, 103-*k* and 104-*k* for any integer k in the interval [1, n].

If the cell voltage rating is of the order of about 1 to 5 kV, the resistance (or resistive component of the impedance) of each connecting element should not be greater than approximately 1Ω, and preferably not greater than a few hundred mΩ. Cells with a higher voltage rating may be interconnected using connecting element with a relatively lower resistance and vice versa. A further design rule can be formulated as a complement or alternative to the above, namely, that the resistance of each connecting element is to be related by a constant factor to the resistance difference arising from tolerances in corresponding cells. For instance, if the resistance of two corresponding cells is subject to a tolerance of ±5 mΩ, then the resistances may at most differ by 10 mΩ, and the resistance of the connecting element(s) between these cells may be set to a value 10 or 100 times greater than this resistance difference, that is, to 100 mΩ or 1Ω.

Figure 2:
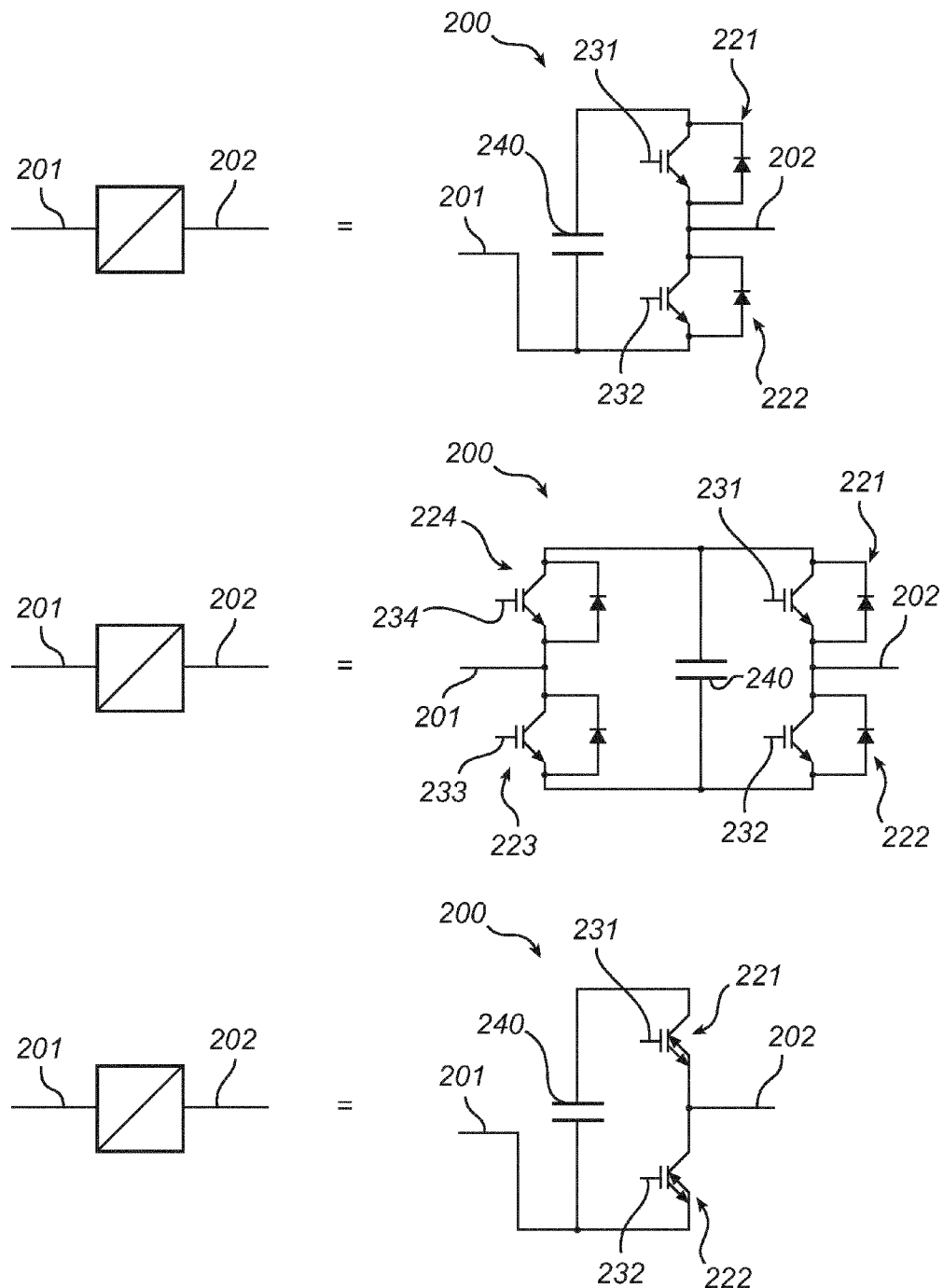
FIG. 2 explains the cell symbol used in FIGS. 1, 3 and 5.

FIG. 2 exemplifies three possible meanings of the cell symbol used in FIG. 1, namely cells drawn schematically according to a basic cell design 200. Firstly, referring to the top portion of the drawing, the cell may be embodied as a half bridge (or CTL), wherein a capacitor 240 is connected via switches 221, 222 to a first and a second terminal 201, 202. Here, the switches 221, 222 are implemented as RC-IGBTs, the conduction states of which may be controlled by applying a suitable gate voltage at gate terminals 231, 232. Typically, the gate voltage is generated by a gate unit (or gate controller), which has been omitted from the drawings for the sake of simplicity.

Secondly, FIG. 2 shows a cell comprising four switches 221, 222, 223, 224 connected in full-bridge (or H bridge or chain link) configuration. The full-bridge circuit includes a capacitor 240.

Thirdly, referring to the bottom portion of FIG. 2, the cell may include one or more BIGT acting as the switches 221, 222. Apart from this difference, the upper and lower half-bridge cells shown in FIG. 2 may be indistinguishable from an electric point of view.

With reference to FIG. 2 as a whole, it is noted that the terminals 201, 202 of the symbol coincide with those of the actual circuit 200. In the assembled VSC, it follows from this that the first terminal 201 of a given cell 101-(*k*+1) may coincide with the second terminal 202 of an adjacent cell 101-*k* in the same group, as shown in FIG. 1. Alternatively, in cases where a common connecting element is provided between corresponding cells, the first and second terminals of adjacent cells may as well be structurally separate elements arranged on each side of the connecting element, as illustrated in FIG. 5.

Figure 3:
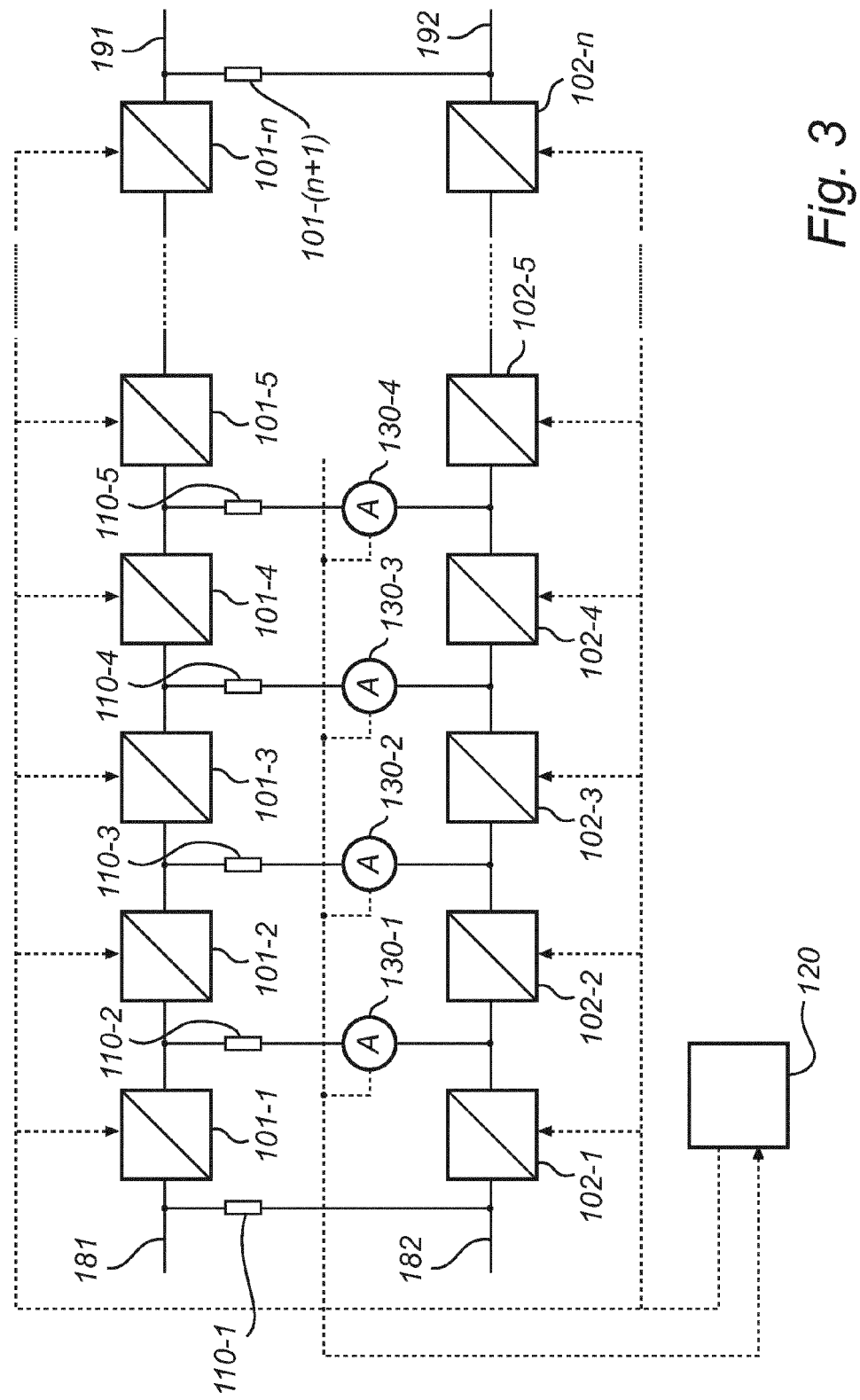

With reference now to FIG. 3, a modular VSC according to a second embodiment of the invention comprises two groups 101-*k*, 102-*k* (k=1, . . . , n) of n cells and converter output terminals 181, 182, 191, 192, similarly to FIG. 1. Resistive connections 110-*k* arranged in series with current sensors 130-*k* (k=1, . . . , n+1) extend from each connection point between adjacent cells in the first group to the corresponding connection point in the second group. As an alternative to the serially connected ammeters 130-*k*, large currents may advantageously be measured indirectly by monitoring the voltage across each resistive connection 110-*k*. A controller 120 is responsible for causing the cells to switch at appropriate points in time, in order that a desired output waveform is obtained at the converter output terminals 181, 182, 191, 192. As indicated by dashed lines on the drawing, the controller 120 is communicatively connected to each of the cells, on the one hand, by supplying control signals to the cells and, on the other hand, by receiving measurements from each of the current sensors 130-*k*. This allows the controller 120 to detect a faulty cell and to take appropriate action, as described above. It is noted that operation with one or more faulty cells will dissipate some of the input power. Hence, to fulfil a given output power requirement without compromising safety during a temporary malfunction condition, it is advisable to arrange for some power redundancy on the input side of the VSC.

Figure 4:
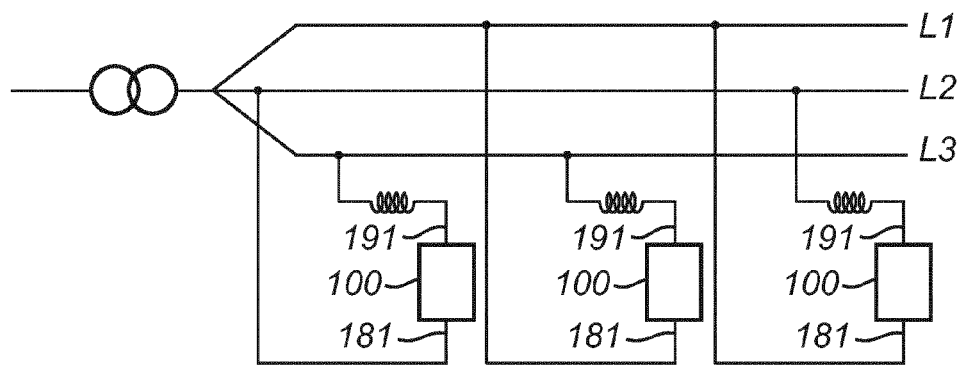
FIG. 4 is a simplified circuit diagram illustrating an intended application of the invention.

A VSC according to the invention may be adapted for use as part of an AC power distribution network or in connection therewith. In particular, the VSC may be used to feed electric power from small and medium-sized plants into the commercial power network. Hence, even though adaptability is a prominent advantage of the invention, it is primarily contemplated to provide VSCs for switching voltages in the range from 1 kV to a few hundreds of kV. For exemplifying purposes only, FIG. 4 shows a three-phase VSC arrangement, wherein converter output terminals 181, 191 of three VSC units 100 are connected between phases L1, L2, L3 in delta configuration, in series with respective inductive elements.

Figure 5:
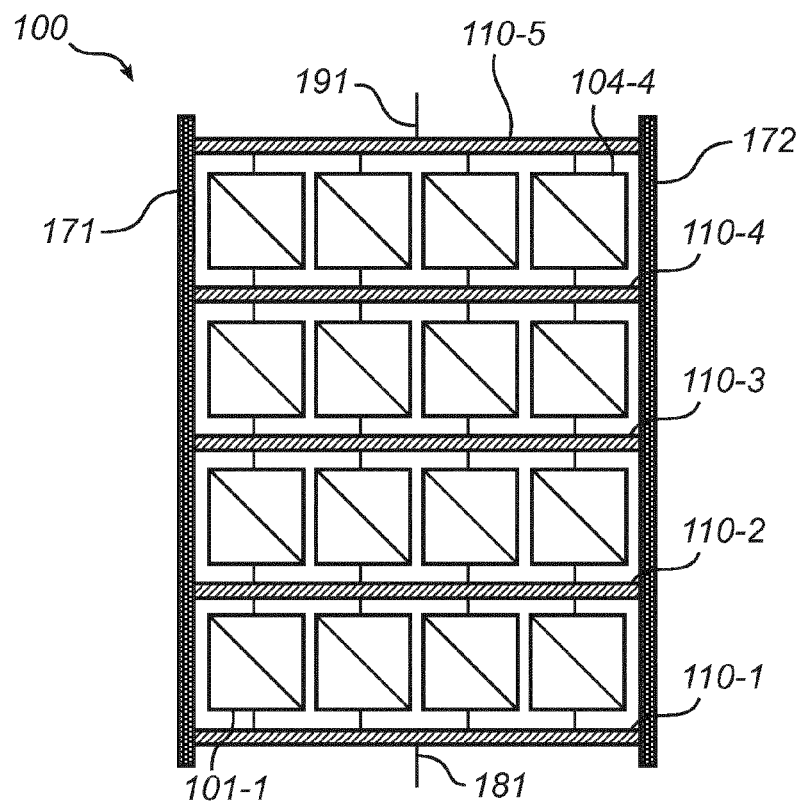

A VSC 100 according to a third embodiment shown in FIG. 5 illustrates the potential structural benefits offered by the invention. In this embodiment, a 4×4 arrangement of cells is formed by means of five interposed connecting elements 110-1, 110-2, 110-3, 110-4, 110-5 provided in the form of rigid conductive bars. The connecting elements extend between insulating rods 171, 172 extending transversally to the connecting elements. Six non-rotatable joints are formed between the rods 171, 172 and the connecting elements 110-1, 110-2, 110-3, 110-4, 110-5.

As a possible alternative to the structure shown in FIG. 5, the non-rotatable joints may be replaced by rotatable joints, capable of transmitting compressive and/or tensile forces but substantially no torques. To give the structure enough shear stiffness in the plane of the drawing, however, it is possible to add one or more struts or ties (not shown) extending obliquely across the structure. If the added elements are electrically insulated or made of an insulating material, they may be connected at points directly on the connecting elements.

The dimensions of each bar 110-*k* may be chosen with regard primarily to the desired mechanical properties, such as a required structural stiffness and/or ductility in order to withstand mechanical stresses that are expected to arise in a short-circuit event. Once the cross-section area of the bar has been determined, its material is chosen in order that the resulting resistance has a value deemed suitable for the purpose. More precisely, the dynamic electric properties of the cell arrangement may be assessed by computations and simulations and may form a basis for finding a resistance at which the interconnections allow electric imbalances to even out with a suitable time constant while they limit any currents flowing between corresponding elements appropriately. This design requirement may be met if a high-resistivity alloy, e.g., Nichrome™, Kanthal™, Chromel™ or a bulk ceramic material is used. Other metallic and non-metallic high-resistivity materials adapted for use in high-voltage resistors can generally be expected to be suitable for manufacturing the connecting elements according to the present invention.

Even though the invention has been described with reference to specific exemplifying embodiments thereof, many different alterations and modifications will become apparent to those skilled in the art after studying this description. The described embodiments are therefore not intended to limit the scope of the invention, which is only defined by the appended claims. For example, VSCs may be formed by arranging cells in a 16×1, 8×2, 4×3, 4×4 configuration without leaving the scope of the invention.

The invention claimed is:

1. A modular voltage source converter, comprising:
   a plurality of cells conformal to a basic cell design comprising a first and a second terminal, a capacitor and at least two switches arranged in a half-bridge configuration, wherein:
      a first group is formed by a number n of said cells connected serially at their terminals; and
      a second group is formed by an equal number n of said cells connected serially at their terminals,
      wherein each of the terminals of the cells in said first group are connected, via a current limiting connecting element, to a corresponding one of the terminals of a corresponding one of the cells in said second group and the serial connections between the cell terminals are realized as low-impedance conductive elements.

2. The modular voltage source converter of claim 1, wherein the basic cell design comprises four switches arranged in a full-bridge configuration.

3. The modular voltage source converter of claim 1, wherein at least one of said connecting elements is a resistive element.

4. The modular voltage source converter of claim 1, wherein at least one of said connecting elements is an inductive element.

5. The modular voltage source converter of claim 1, wherein said connecting element is adapted to structurally reinforce the converter.

6. The modular voltage source converter of claim 4, wherein said connecting element is a bar of a high-resistivity material.

7. The modular voltage source converter of claim 1, wherein corresponding cells belonging to different groups are operated in such manner as to provide identical momentary terminal voltages.

8. The modular voltage converter of claim 1, further comprising a controller for controlling the conduction state of switches in the cells, wherein the controller is configured to set corresponding switches of corresponding cells belonging to different groups into a common conduction state.

9. The modular voltage source converter of claim 1, further comprising at least one current sensor arranged to sense current flowing in said connecting element.

10. The modular voltage source converter of claim 1, wherein:
    at least one further group is formed by an equal number n of cells connected serially at their terminals; and
       said connecting elements connect the first terminals of corresponding cells in said first, second and at least one further groups.

11. The modular voltage source converter of claim 1, wherein a switch in the basic cell design is one of:
    an insulated gate bipolar transistor, IGBT;
    a reverse-conducting insulated gate bipolar transistor, RC-IGBT;
    a bi-mode insulated gate transistor, BIGT;
    a gate turn-off thyristor, GTO;
    an integrated gate commutated thyristor, IGCT;
    a metal-oxide-semiconductor field-effect transistor, MOSFET.

12. A method in a modular voltage source converter, comprising the steps of:
    repeating a basic cell design comprising a first and a second terminal, a capacitor and at least two switches arranged in a half-bridge or full-bridge configuration, to provide a plurality of cells;
    connecting a number n of said cells serially at their terminals to form a first group;
    connecting an equal number n of cells serially at their terminals to form a second group; and
    connecting each of the terminals of the cells in said first group to a corresponding one of the terminals of a corresponding one of the cells in said second group using a current limiting connecting element,
    wherein the number n of cells in each group is chosen in accordance with a rated switching voltage and the serial connections between the cell terminals are realized as low-impedance conductive elements.

13. The method of claim 12, further comprising the steps of:
    i) connecting an equal number n of cells to form a further group;
    ii) connecting the terminals of corresponding cells belonging to different groups using said connecting element; and
    repeating steps i) and ii) until a number m of parallel groups is provided, wherein the number m of parallel groups is chosen in accordance with a rated switching current.

14. The method of claim 12, further comprising the steps of:
    operating corresponding cells belonging to different groups in such manner as to provide identical momentary terminal voltage at the terminals of each of the cells, wherein the terminals of the cells are interconnected via said connecting elements;
    sensing a current flowing through the connecting element and determining, in response to the current exceeding a threshold, an abnormal condition.

15. The method of claim 12, further comprising, in response to an abnormal condition having been determined, the step of:
  locating at least one faulty cell; and
  operating those cells which correspond to the faulty cell and belong to different groups in a zero-voltage mode.

16. The modular voltage source converter of claim 2, wherein at least one of said connecting elements is a resistive element.

17. The modular voltage source converter of claim 2, wherein at least one of said connecting elements is an inductive element.

18. The modular voltage source converter of claim 2, wherein said connecting element is adapted to structurally reinforce the converter.

19. The modular voltage source converter of claim 3, wherein said connecting element is adapted to structurally reinforce the converter.

20. The modular voltage source converter of claim 4, wherein said connecting element is adapted to structurally reinforce the converter.

* * * * *